(12) United States Patent
Strobel et al.

(10) Patent No.: US 10,000,231 B2
(45) Date of Patent: Jun. 19, 2018

(54) DEVICE FOR APPLYING AN AUXILIARY FORCE IN A MOTOR VEHICLE STEERING SYSTEM

(71) Applicants: ThyssenKrupp Presta AG, Eschen (LI); ThyssenKrupp AG, Essen (DE)

(72) Inventors: Joseph Strobel, Mauren (LI); Reto Zogg, Malans (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days. days.

(21) Appl. No.: 15/307,444

(22) PCT Filed: Apr. 8, 2015

(86) PCT No.: PCT/EP2015/057557
§ 371 (c)(1),
(2) Date: Oct. 28, 2016

(87) PCT Pub. No.: WO2015/165698
PCT Pub. Date: Nov. 5, 2015

(65) Prior Publication Data
US 2017/0050667 A1  Feb. 23, 2017

(30) Foreign Application Priority Data
Apr. 28, 2014 (DE) .......... 10 2014 105 921

(51) Int. Cl.
*F16H 57/12* (2006.01)
*B62D 5/04* (2006.01)
(Continued)

(52) U.S. Cl.
CPC .......... *B62D 5/0409* (2013.01); *F16C 27/066* (2013.01); *F16C 35/077* (2013.01);
(Continued)

(58) Field of Classification Search
CPC ..................... B62D 5/0409; B62D 5/0403
(Continued)

(56) References Cited

U.S. PATENT DOCUMENTS 9,216,760 B2    12/2015  Hafermalz et al.
2014/0174843 A1*  6/2014  Kimoto ............... B62D 5/0424
                                               180/444
(Continued)

FOREIGN PATENT DOCUMENTS

DE      102008002769 A1    8/2009
DE      10 2008 001878    * 11/2009
(Continued)

OTHER PUBLICATIONS

English translation of abstract of DE 102008043792 A1.
Int'l Search Report for PCT/EP2015/057557 dated Jun. 29, 2015 (dated Jul. 8, 2015).

*Primary Examiner* — Tony H Winner
(74) *Attorney, Agent, or Firm* — thyssenkrupp North America, Inc.

(57) ABSTRACT

An apparatus for applying an auxiliary force in a motor vehicle steering unit may include a driving worm that is connectable to an electric motor and applies an auxiliary force on the motor vehicle steering unit through a worm wheel. The driving worm may be housed in a roller bearing. The roller bearing can be pivoted about a pivoting axis defined by a pivot element outside the roller bearing.

11 Claims, 3 Drawing Sheets

(51) Int. Cl.
*F16C 35/077* (2006.01)
*F16C 27/06* (2006.01)
*F16H 57/021* (2012.01)
*B62D 3/12* (2006.01)

(52) U.S. Cl.
CPC ............ *F16H 57/021* (2013.01); *B62D 3/12* (2013.01); *F16H 2057/0213* (2013.01)

(58) Field of Classification Search
USPC .................................. 180/443, 444; 74/425
See application file for complete search history.

(56) References Cited

U.S. PATENT DOCUMENTS

| | | | |
|---|---|---|---|
| 2015/0266506 A1* | 9/2015 | Sato .................... | B62D 5/0421 180/444 |
| 2016/0185381 A1* | 6/2016 | Noguchi .............. | B62D 5/0409 180/444 |

FOREIGN PATENT DOCUMENTS

| | | |
|---|---|---|
| DE | 102008001878 A1 | 11/2009 |
| DE | 102008043792 A1 | 5/2010 |
| DE | 102012103146 A1 | 10/2013 |
| EP | 2423075 A2 | 2/2012 |
| WO | 9911502 A1 | 3/1999 |
| WO | 2008/087749 A1 | 7/2008 |

* cited by examiner

DEVICE FOR APPLYING AN AUXILIARY FORCE IN A MOTOR VEHICLE STEERING SYSTEM

CROSS REFERENCE TO RELATED APPLICATIONS

This application is a U.S. National Stage Entry of International Patent Application Serial Number PCT/EP2015/057557, filed Apr. 8, 2015, which claims priority to German Patent Application No. DE 10 2014 105 921.2 filed Apr. 28, 2014, the entire contents of both of which are incorporated herein by reference.

FIELD

The present disclosure relates to devices for applying auxiliary forces in motor vehicle steering units.

BACKGROUND

Steering shafts for motor vehicle steering units with electrical or electromechanical support of auxiliary forces are basically known. The steering shafts exhibit an input shaft, which is connected to the steering wheel, which in turn the driver of a motor vehicle uses to introduce a steering torque as a steering command to the motor vehicle steering unit. An output shaft connected to an input shaft is foreseen to transfer the steering torque via tie rods to the wheels to be steered. In order to determine the supporting force needed in each case for an electrical or electromechanical auxiliary force support connected to the output shaft, the input and output shafts are typically elastically connected to each other by a torsion bar and the torque introduced by the driver onto the input shaft can be determined by measuring the relative torsion between the input and output shafts.

Auxiliary force supports, for example electrical or electromechanical auxiliary force supports, are used to introduce the corresponding auxiliary torques typically onto the output shaft, the steering pinion or the rack. In this way the respective auxiliary force support is driven with regards to the output shaft through the determination of the torque introduced by the driver onto the input shaft using the steering wheel.

It is known for electromechanical auxiliary force supports in motor vehicle steering units that the respective supporting force is introduced by an electrical motor, whereby the supporting force is, for example, transferred via a driving worm onto a worm wheel, which is connected to the steering train. To this purpose the electrical motor is typically connected to the driving worm, either through a direct positioning of the driving worm onto the output shaft of the electrical motor, or through a gear that is positioned between the electrical motor and the driving worm. The driving worm acts on a worm wheel, which transfers the torque, for example, via a gear, a rack-and-pinion mechanism or a belt drive onto the specific steering train. In this way the auxiliary force support can introduce the supporting force, for example, in the area of the steering shaft, the steering pinion or the steering rack.

The driving worm is normally enclosed in a housing of the apparatus using a roller bearing. In order to provide for an angle compensation in the bearing position, through which, for example, installation tolerances or a bending of the driving worm due to the arising radial forces, which can result from a slight deflection of the driving worm, can be compensated for, compensation and suspension mechanisms can be used. As a result of the angle compensation achieved in this way, the roller bearing can be operated such that only radial components need to be supported whereby the noise level is reduced.

In EP 2 423 075 A2, an electrical steering fixture is described, by which a bearing supporting the driving worm is arranged between the roller bearing and the housing of the auxiliary force support using a spring ring, which exhibits leaf spring elements. As a result the bearing is adjustable in all directions and a defined pivoting axis for an angle compensation is not provided for.

BRIEF DESCRIPTION OF THE FIGURES AND TABLES

DETAILED DESCRIPTION

Figure 1:
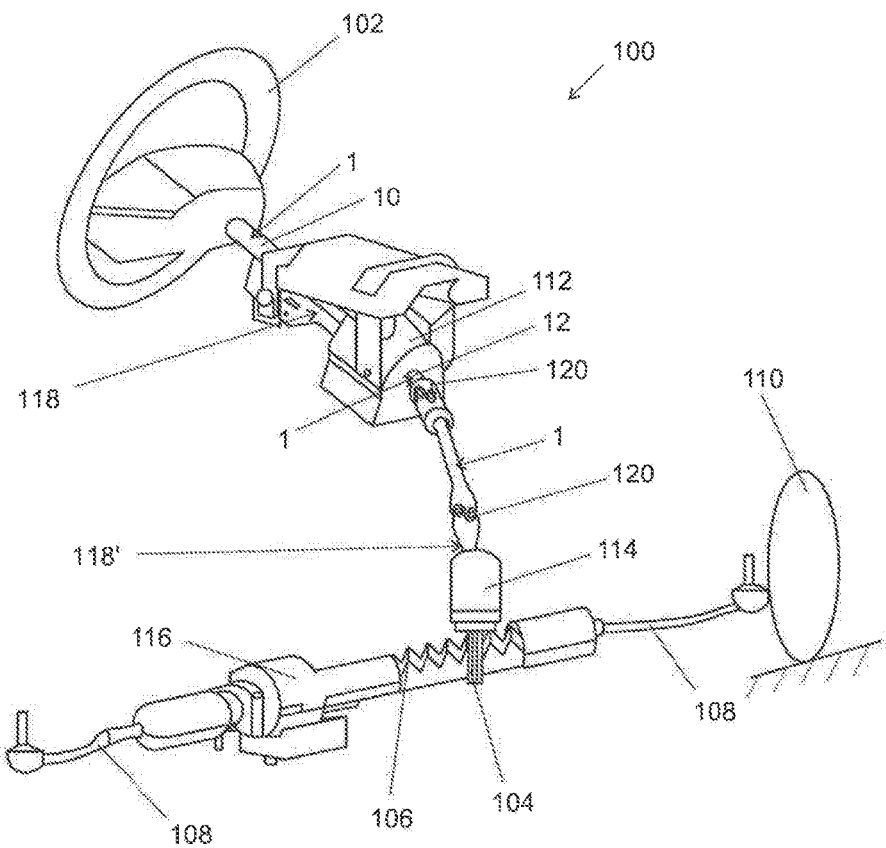
FIG. 1 is a schematic perspective view of an example steering unit for a motor vehicle with an auxiliary force support.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

One example goal of the present disclosure is to provide an apparatus for the application of a supporting force in an auxiliary force support for a motor vehicle steering unit that exhibits an improved bearing behavior.

Accordingly an apparatus for the application of a supporting force in a motor vehicle steering unit is suggested, that includes a driving worm connectable to an electrical motor, which acts on a worm wheel to apply an auxiliary force in a motor vehicle steering unit, whereby the driving worm is rotatable about the axis of at least one bearing. According to the invention, the bearing is adjustable about a pivoting axis, which is defined by at least one pivot element arranged outside of the bearing. The bearing is preferred as a roller bearing, especially preferred as a ball bearing, formed to reach a reduction in the friction.

Since the bearing or the roller bearing is pivotable about a pivoting axis, which is defined by at least one pivot element arranged outside of the bearing or ball bearing, a defined pivotability of the bearing or the roller bearing and as a result, a defined angle compensation can be attained. In particular it is possible in this way to provide for an angle compensation of the driving worm about a defined pivoting axis, in order to achieve an improved drive behavior and in particular an improved acoustic behavior. On the other hand, the degrees of freedom of the bearing or the roller bearing during a pivoting in the other directions are reduced in order, for example, to decrease hysteresis effects caused by a back and forth swinging of the driving worm during changes in load.

Since at least one pivot element is arranged outside of the bearing, in particular the roller bearing, a standard roller bearing which does not require any special requirements for its installation, can be used. The roller bearing itself can be manufactured appropriately simple and economically.

In addition, through the arrangement of the pivot element outside of the bearing or roller bearing, the installation of the apparatus is simplified overall since the bearing or roller bearing itself does not need to be installed particularly pivotable but merely between the pivot elements.

The bearing or roller bearing is preferably contained in an outer sleeve, which exhibits two opposite one another and radially inwards or outwards extending bearing noses that form the pivot element. In this way, the pivoting axis of the bearing or roller bearing can be set up in a simple but effective manner and be adapted to the particular constructional requirements of the motor vehicle steering unit. Accordingly the bearing or roller bearing, preferably with its outer ring, fits closely to the bearing noses, in such a way that the bearing can be pivoted about the pivoting axis defined in this manner.

An elastic element is particularly preferred between the bearing and the outer sleeve containing the bearing or roller bearing. In particular a rubber embedding is foreseen that preferably dampens small radial movements and if necessary also axial movements.

The bearing noses are preferably arranged on the outer sleeve. In the simplest case, at least two bearing noses on the outer sleeve are inwards orientated so that the bearing either directly or indirectly, for example through an elastomeric intermediate layer, is supported in the corresponding direction of the axial movement of the driving worm. Using four bearing noses, both directions of the axial movement can be supported whereby the pivotability is guaranteed. However, in this case all four bearing noses must be arranged parallel to one another and their longitudinal axes must intersect all of the axes of the bearing or roller bearing. Alternatively the outer sleeve may exhibit two outwards orientated bearing noses that are contained in a housing of the apparatus so that they are pivotable and as a result the pivoting axis of the bearing or roller bearing is defined.

Preferred are two bearing noses arranged on the face side of the outer sleeve facing the driving worm and two bearing noses arranged on the far face side of the outer sleeve facing away from the driving worm in order to maintain a reliable mounting of the bearing or roller bearing in the outer sleeve and at the same time provide a defined pivoting axis.

Particularly preferred are four bearing noses lying in a plane that support the bearing or roller bearing. In this way, a mechanically simple and effective mounting of the bearing or the roller bearing and at the same time a clear definition of the pivoting axis is provided for.

In a preferred formation the pivoting axis defined by at least one pivot element is arranged basically parallel to the rotational axis of the worm wheel. In this manner, an angle compensation is ensured that avoids a seizing up of the driving worm when the latter is deformed by radial forces during operation. At the same time, however, a vibration of the driving worm in a plane perpendicular to the deformation direction can be avoided and correspondingly the appearance of hysteresis reduced or avoided.

In a further development, an inner sleeve containing the bearing or roller bearing is concentrically arranged between the outer sleeve and the bearing or roller bearing, which inner sleeve is pivotable relative to the outer sleeve as it is supported by at least one pivot element.

Preferably arranged between the bearing or roller bearing and the outer sleeve or sleeve, an elastomeric element or an elastomeric element is vulcanized onto the bearing or roller bearing and/or onto the outer sleeve or sleeve. Through this flexible position, for example, an elastomeric sleeve, a dampening, in particular an acoustic dampening of the roller bearing relative to the outer sleeve or sleeve or rather relative to the housing, can be achieved. At the same time, a pivoting of the bearing or the roller bearing about the pivoting axis is made possible.

In a further preferred formation, bearing noses are arranged on the end sides of the housing and/or outer sleeve facing the axial direction of the driving worm as well as on the end sides of the outer sleeve facing away from the driving worm. Correspondingly the bearing or roller bearing is held between four bearing noses, whereby in each case two bearing noses are arranged in a plane facing the axial direction of the driving worm and two bearing noses are arranged in a plane facing away from the axial direction of the housing. The bearing noses all lie in the same plane containing the axis of the bearing or roller bearing.

In order to provide for a reliable and low-friction pivoting, the outer sleeve exhibits in its axial direction a width that is greater than the width of the bearing or the outer ring of the roller bearing in its axial direction.

In an advantageous further development, a section of the housing of the apparatus forms the outer sleeve and is closed by a cover to hold the bearing or roller bearing In the following preferred exemplary, embodiments are described based on the figures. Identical, similar or similarly-appearing elements are given identical reference signs in the different figures and a repeated description of these elements in the subsequent descriptions is partially waived upon to avoid redundancies.

A schematic representation of a motor vehicle steering unit 100 is shown in FIG. 1 in which a driver can apply a corresponding torque in a steering movement onto the steering column 1 using a steering wheel 102. The torque is then transferred by the steering column 1 onto the steering pinion 104, which meshes with a rack 106, which in turn transfers the predetermined steering angle onto the steerable wheels 110 of a motor vehicle via the corresponding track rods 108.

An electrical and/or hydraulic support of an auxiliary force can be provided by an auxiliary force support 112 connected with steering column 1, by an auxiliary force support 114 connected with the steering pinion 104 and/or by an auxiliary force support 116 connected with the rack 106. The respective auxiliary force support 112, 114 or 116 transfers an auxiliary force onto the steering column 1, the steering pinion 104 and/or the rack 106, whereby the driver is supported in his steering work. The possible different positions for the arrangement of the three auxiliary force supports 112, 114 and 116 are illustrated in FIG. 1.

Typically only one of the shown positions is used for an auxiliary force support. The auxiliary force, which should be applied to support a driver using one of the auxiliary force supports 112, 114 or 116, is determined considering the input torque as measured by a torque sensor 118. Alternatively or in combination with the application of the auxiliary force, an additional steering angle can be introduced into the steering unit using the auxiliary force supports 112, 114 and 116. This additional angle is added up to the steering angle applied by the driver using the steering wheel 102.

The steering shaft 1 exhibits an input shaft 10 connected to the steering wheel 102 and an output shaft 12 connected to the rack 106 via the steering pinion 104. The input 10 and output shaft 12 are coupled with one another and are torsionally flexible through a torsion rod that cannot be recognized in FIG. 1. Thus a torque applied by a driver to the input shaft 10 via the steering wheel 102 always leads to a rotation of the input shaft 10 relative to the output shaft 12 when the output shaft 12 does not rotate exact synchronously with the input shaft 10. This relative rotation between input 10 and output shaft 12 can, for example, be measured by rotational angle sensor and due to the known torsional strength of the torsion rod a corresponding input torque relative to the output shaft 12 can be determined. In this way, the torque sensor 118 is constructed through the determination of the relative rotation between the input shaft 10 and the output shaft 12. Such a torque sensor 118 is basically known and can, for example, be realized in the form of a rotary slide valve, an electromagnetic or other measurement of the relative rotation.

Accordingly a torque, which is applied by the driver through the steering wheel 102 onto the steering column 1 or rather the input shaft 10, will only give rise to the entry of an auxiliary torque through one of the auxiliary force supports 112, 114 or 116 if the output shaft 12 is rotated against the rotation resistance of the rotational rod relative to the input shaft 10.

The torque sensor 118 can alternatively be arranged in the position 118', whereby then the fracture of the steering shaft 1 into input 10 and output shaft 12 and the rotational-elastic coupling through the rotational rod correspondingly at a different position lies on hand. From the relative rotation of the output shaft 12 coupled to the input shaft 10 by the rotational rod, a relative rotation and hence correspondingly an input torque and/or an auxiliary force to be applied can be determined.

The steering shaft 1 in FIG. 1 furthermore includes at least one cardan joint 120, which can be used to adjust the movement of the steering shaft 1 in the motor vehicle to the spatial conditions.

Figure 2:
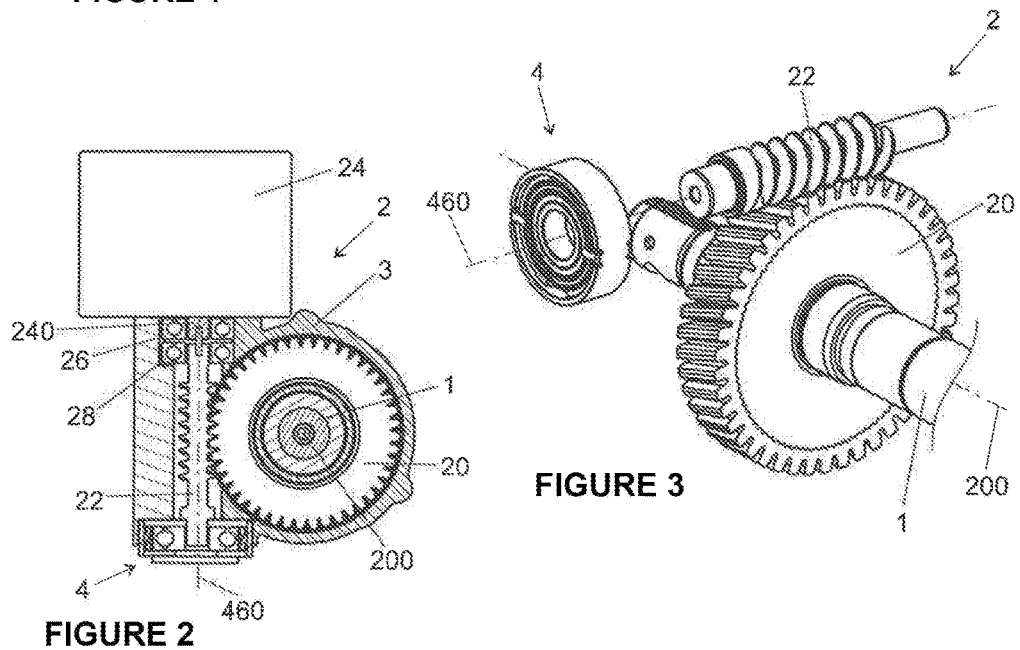
FIG. 2 is a schematic cross-sectional view of an example apparatus for the application of an auxiliary force in a motor vehicle steering unit.

A schematic cross-section of an apparatus 2 for the application of an auxiliary force in a motor vehicle steering unit is shown in FIG. 2. A worm wheel 20 is foreseen, which is connected to a schematically shown steering shaft 1. A rotation of the worm wheel 20 about its rotational axis 200, which here is formed by the steering shaft 1, brings about the application of an auxiliary force or rather an additional force on the steering shaft 1 and correspondingly an auxiliary force or rather an additional steering angle into the steering train.

The worm wheel 20 is powered by a driving worm 22, which in turn is driven by a schematically represented electric motor 24. The output 240 of the electric motor 24 is coupled to the driving worm 22 in order to transfer the torque.

A housing 3 of apparatus 2 is shown in the cross-sectional view of FIG. 2, whereby a first roller bearing 26 is contained in the housing 3. The output 240 of the electric motor 24 is supported radially by the roller bearing 26. Furthermore a second radial bearing 28 is foreseen in which the driving end of the driving worm 22 is radially supported.

The end of the driving worm 22 opposite to the output 240 of the electric motor 24 is seated in a bearing fixture 4, which will be further described below. The bearing fixture 4 also allows an angle compensation besides a radial housing of the driving worm 22.

Figure 3:
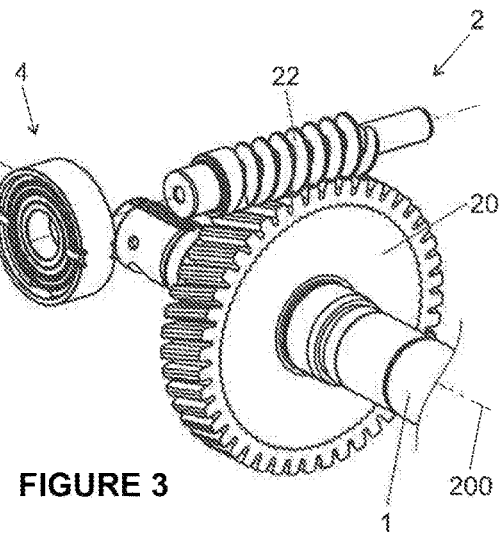
FIG. 3 is a schematic perspective view of components of the example driving worm of FIG. 2.

FIG. 3 is a schematic representation of single components of apparatus 2, whereby here in particular the steering shaft 1, the worm wheel 20, the driving worm 22 and the bearing fixture 4 for the housing of the end opposite to the driving end of the driving worm 22 are shown.

Figure 4:
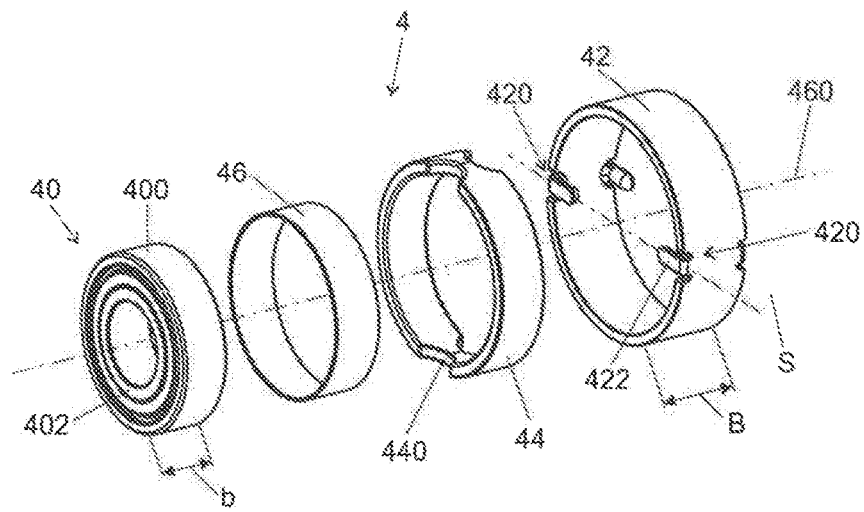
FIG. 4 is a schematic exploded view of an example bearing fixture for the driving worm of a worm drive.
Figure 5:
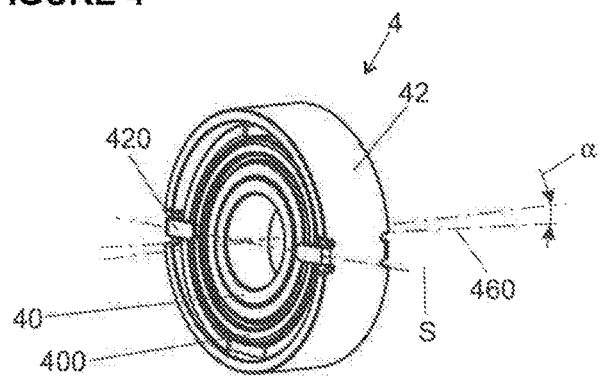
FIG. 5 is a schematic perspective view of the example bearing fixture of FIG. 4 in an assembled state.

In FIGS. 4 and 5, the bearing fixture 4 is illustrated in different representations, whereby in FIG. 4 individual components of the bearing fixture are shown in an exploded view and FIG. 5 shows the bearing fixture 4 in an assembled state. The bearing fixture 4 includes a standard roller bearing 40 which exhibits an outer ring 400, an inner ring 402 and in between rolling elements housed in a cage. These components are not shown in the diagram. In the exemplary embodiment, the roller bearing 40 consists of a traditional industrial roller bearing.

The bearing fixture 4 includes an outer sleeve 42 in which the roller bearing 40 is inserted. The outer sleeve 42 exhibits pivot elements 420, which support the roller bearing 40 in the axial direction and which at the same time define a pivot axis S around which the roller bearing 40 is pivotable. In the present embodiment, the pivot elements 420 have been designed in the form of bearing noses 422, which are arranged radially opposite each other in the outer sleeve 42 and relative to the outer sleeve 42 extend radially inwards. The roller bearing 40 is supported correspondingly by its outer ring 400 at the bearing noses 422, whereby the latter are arranged outside of the roller bearing 40 and do not intervene with it. In particular the bearing noses 422—in contrast to standard pivot bearings—are not introduced into a complementary insertion in the outer ring 400 of the roller bearing. The roller bearing 40 lies rather loosely on the bearing noses 422 and in principle can freely be moved.

In the exemplary embodiment, the inner ring 402 is not bridged by the bearing noses 422, so that the driving worm 22 can be taken up by the roller bearing 40 without any problems and without coming into contact with the bearing noses 422.

The design of the bearing noses 422 obstructs a roller bearing 40 enclosed in the outer sleeve 42 in such a way that it cannot be removed from the outer sleeve 42 without destroying or bending the bearing noses 422.

In the exemplary embodiment, the pivot elements 420 are formed by the bearing noses 422 and define a pivot axis S of the roller bearing 40. The pivot axis S can—as indicated in FIGS. 4 and 5—run directly through the pivot elements 420. In other words the roller bearing 40 pivots about a pivot axis S defined by the bearing noses 422 so that the pivot axis S lies outside of the roller bearing 40.

As revealed in FIG. 5, the bearing noses 422 fit onto the outer ring 400 of the roller bearing 40 such that they keep the roller bearing 40 in the outer sleeve 42 pivotable about a pivot axis S defined by the bearing noses 422 facing each other. For example this can be seen in FIG. 5, as the bearing axis 460 is pivotable by an angle α. The pivot axis S lies outside of the roller bearing 40, which, together with its outer ring 400, fits onto the bearing noses 422.

In order to obtain a pivotability of the roller bearing 40 in the outer sleeve 42 at all despite the bearing noses 422, a play as small as possible is preferably foreseen. In particular the width B of the outer sleeve 42 in the axial direction is larger than the width b of the roller bearing 40.

The roller bearing 40 is only placed between the pivot elements 420. A fixed connection to the structures of the outer sleeve 42 is not foreseen in the exemplary embodiment.

In one version the pivot axis S can pass through the roller bearing 40, for example, through the middle of the axial extension of the outer ring 400 between its end faces. Such a form can be realized in particular if—as shown in FIGS. 4 and 5—two bearing noses 422 are foreseen on the front and back end, respectively, of the outer sleeve 42. These bearing noses 422 hold the roller bearing 40 between them or rather support it. If, in this case, the pivot axis S does not lie in a plane containing the two bearing noses 422 lying on one side of the outer sleeve 42, but rather between the planes defined by the face ends of the roller bearing 40, then a pivoting about the bearing noses 422 and simultaneously a slipping of the contact point between the roller bearing 40 or rather its outer ring 400 and the respective bearing nose 422 takes place. For example if the pivot axis S lies directly in the middle between the face ends of the roller bearing 40, then a slipping of the respective contact points between the roller bearing 40 and the corresponding bearing noses 422 on the front and back face ends will take place in opposite directions.

Furthermore, in exemplary embodiment, an inner sleeve 44, which houses the roller bearing 40 and is basically concentric and pivotable within the outer sleeve 42, is foreseen. The inner sleeve 44 is connected with the bearing noses 422 such that a pivoting of the inner sleeve 44 about the pivoting axis S defined by the bearing noses 422 is also made possible.

In addition, an elastomeric element 46 is foreseen between the inner sleeve 44 and the roller bearing 40, which allows a flexible housing of the roller bearing 40 within the inner sleeve 44. In the exemplary embodiment, the elastomeric element 46 has a tubular form and is arranged between the inner sleeve 44 and the roller bearing 40. The elastomeric element 46 can be glued to the roller bearing 40 and/or the inner sleeve 44 or is fixed through frictional bonding. In a preferred embodiment, the elastomeric element 46 can also be vulcanized onto the roller bearing 40 or in the inner sleeve 44. The roller bearing 40 is flexibly held within the inner sleeve 44 by the elastomeric element 46.

Correspondingly the roller bearing 40 is held elastically, vibration-damped and with low play in the inner sleeve 44. The inner sleeve 44 in turn is held within the outer sleeve 42, whereby an axial shift of the inner sleeve 44 and the roller bearing 40 contained within is reduced or rather prevented by the bearing noses 422. As a result, a low-play or backlash-free housing of the roller bearing 40 in the outer sleeve 42 can be achieved, whereby at the same time a pivoting of the roller bearing 40 about the pivoting axis S is made possible.

Recesses 440 on the edges of the inner sleeve 44, in a position that is pivoted by 90° relative to the plane defined by the pivot axis S and the bearing axis 460 of the roller bearing, are foreseen in order to allow for a larger pivoting range of the inner sleeve 44 without allowing a blocking that would be possible without the recesses 440. In particular the angle at which the inner sleeve 44 comes into contact with the outer sleeve 42 can thus be increased so that either a compacter bearing fixture 4 with a reduced outer diameter or a bearing fixture 4 with a larger pivoting angle α can be constructed. In each case, the pivot elements 420 define the pivoting axis S.

The roller bearing 40 can correspondingly be a traditional industrial roller bearing, which through an uptake in the outer sleeve 42 and its positioning in the outer sleeve 42 by the bearing noses 422 is held pivotable about a defined pivoting axis S. An axial shift, however, is basically prevented by the bearing noses 422.

In an embodiment not shown here, the roller bearing 40 can also be directly taken up by the outer sleeve 42, whereby an elastomeric layer or rather a cured-on elastomeric element can be foreseen between the roller bearing 40 and the outer sleeve 42. Correspondingly the roller bearing 40 is held within the outer sleeve 42 through the elastomeric material. A pivotability about the only defined pivoting axis S is achieved through the bearing noses 422, which at the same time also prevent an axial shift of the roller bearing 40.

To mount the bearing fixture 4, the bearing noses 422 can initially be foreseen in a swung-out condition, basically parallel to the bearing axis 460 of the roller bearing 40. They are bent inwards after the roller bearing 40 and possible further components such as the inner sleeve 44 and the elastomeric element 46 are inserted in a way that a basically backlash-free uptake of the roller bearing 40 in the outer sleeve 42 and a shift-free uptake in the axial direction is achieved. At the same time, a defined pivotability about the pivoting axis S provided by the bearing noses 422 is made possible.

As shown in the embodiment, the bearing fixture 4 can then be set up in a housing 3 of an apparatus for the application of an auxiliary force support as indicated in FIG. 2.

Figure 6:
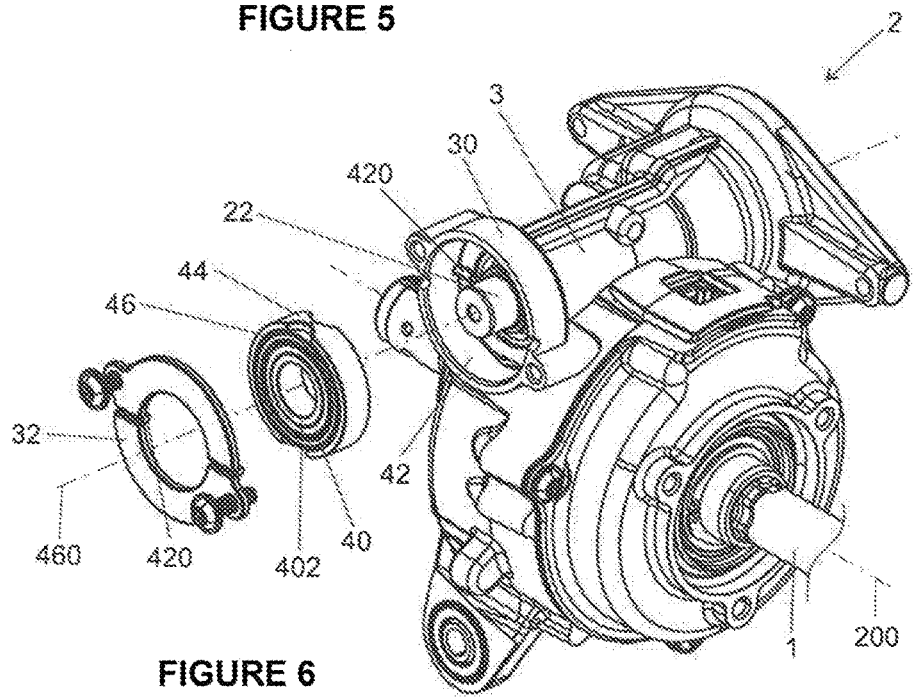
FIG. 6 is a schematic perspective view of another example apparatus for the application of an auxiliary force.

A schematic perspective representation of a further apparatus 2 is shown in FIG. 6, whereby here the housing 3 is shown in a closed state. The housing 3 already contains the worm wheel and the driving worm 22. A section of the housing 30 functions as an outer sleeve 42, in which according to the above described manner already foresees pivot elements 420. The housing section 30 is foreseen to take up the roller bearing 40 together with the elastomeric element 46 and the inner sleeve 44. The roller bearing with the inner ring 402 is put onto the end of the driving worm 22 facing away from the drive and thereby into the housing section 30 that functions as an outer sleeve 42. The pivot elements 420 foreseen for the inner side of the housing section 30 support the outer ring 400 of the roller bearing 40 and/or the inner sleeve 44. In this way, a pivotability of the roller bearing 40 is maintained.

A cover 32 is applied, in which the pivot elements 420 are also incorporated so that a pivotable mounting of the roller bearing 40 can be achieved in the same manner, as explained above in FIGS. 4 and 5 through the availability of the bearing noses 422. The outer sleeve 42 in FIGS. 4 and 5 is here, so to speak, replaced by the housing section 30 and the housing cover 32, which together form the same structure and in particular provide the pivot elements 420 that ensure a defined pivotability.

The pivot elements 420 in the exemplary embodiment are made available in the form of bulges, which essentially exhibit a half-round cross-section on which the outer ring 400 or rather the inner ring 44 can roll off for the pivotability. In the exemplary embodiment, the individual pivot elements 420 are formed in the respective structures. Thus, the housing section 30 or rather the housing cover 32 possesses a very stable construction.

The pivot elements 420 preferentially lie in a plane, which extends parallel to the rotational axis 200 of the worm wheel 20, in order to allow for a defined pivotability of the driving worm 22 for an angle compensation, for example, during the occurrence of high radial forces and, at the same time, to prevent a hysteresis through the back and forth swinging in a direction perpendicular to the direction of pivoting.

Figure 7:
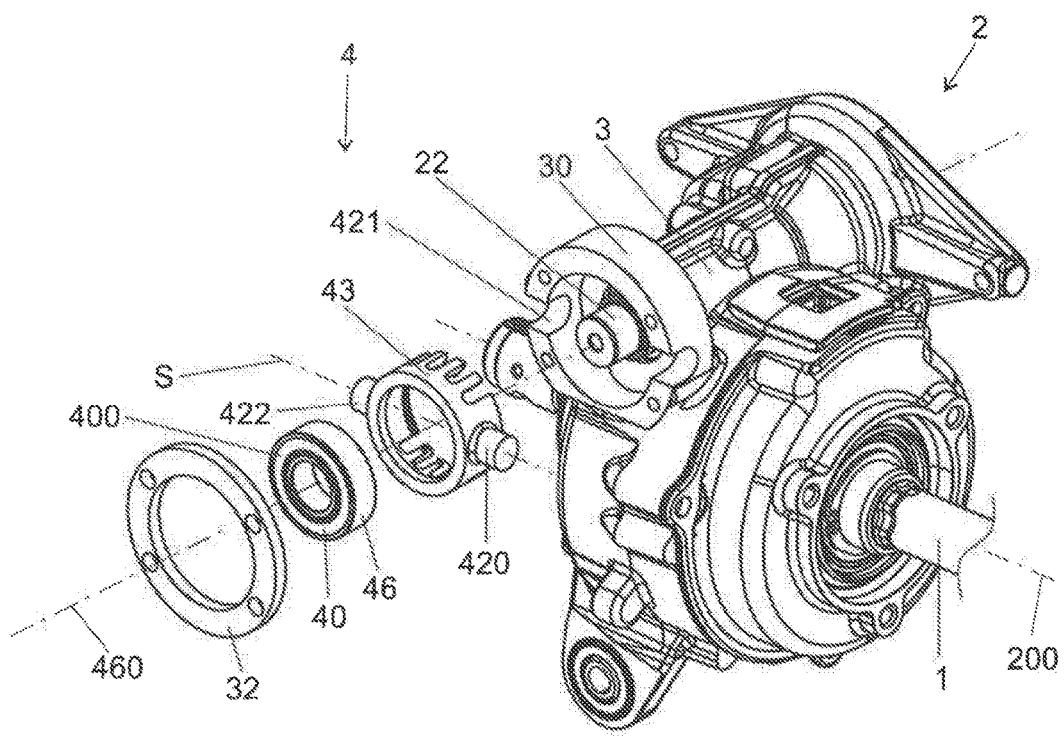
FIG. 7 is a schematic perspective view of still another apparatus for the application of an auxiliary force.

In FIG. 7, a schematic perspective representation of a further apparatus 2 is shown, whereby here the housing 3 is shown in a closed state. The worm wheel and the driving worm 22 have already been incorporated into the housing 3. A housing section 30 includes recesses 421, which are radially arranged in a plane. The bearing fixture 4 includes a sleeve 43 in which the roller bearing 40 and the elastomeric element 46 are incorporated. An axial shifting of the roller bearing 40 in the sleeve 43 can be prevented by a form-locked and/or friction-locked axial bearing lock as well known from the state of the art.

The sleeve 43 exhibits pivot elements 420, which are applicable in the recesses 421 of the housing section 30 and thus define a pivoting axis S, about which the sleeve 43 and the roller bearing 40 are pivotable.

In the present embodiment, the pivot elements 420 exhibit the form of bearing noses 422, which are arranged radially opposite each other on the sleeve 43 and extend radially outwards relative to the sleeve 43.

The pivot elements 420 preferentially lie in a plane which extends parallel to the rotational axis 200 of the worm wheel 20 in order to allow a defined pivoting of the driving worm 22 for an angle compensation, for example, during the appearance of large radial forces, and at the same time a hysteresis through a swinging back and forth in a direction perpendicular to this pivot direction.

In an embodiment not shown here, the roller bearing 40 can also be directly incorporated into the sleeve 43. In an advantageous version, the sleeve 43 is made out of a non-metallic material, preferably a plastic, in order to obtain damping properties similar to those achieved using the elastomeric element.

Where applicable all individual properties that are illustrated in the individual exemplary embodiments can be combined with one another and/or exchanged without leaving the scope of this invention.

What is claimed is:

1. An apparatus for exerting an auxiliary force in a motor vehicle steering unit, the apparatus comprising:
   an outer sleeve having two bearing noses positioned opposite one another and extending one of radially inwards towards, or outwards away from, each other, and which bearing noses form a pivot element defining a pivoting axis;
   an inner sleeve disposed concentrically within and pivotable relative to said outer sleeve, said inner sleeve further being supported by said pivot element;
   a roller bearing disposed concentrically within said inner sleeve and defining a bearing axis, said roller bearing being pivotable about the pivoting axis of the pivot element, which pivot element is disposed outside of the roller bearing;
   a driving worm supported in said roller bearing and rotatable about the bearing axis, said driving worm being connectable to an electric motor; and
   a worm wheel in operative communication with said driving worm, said driving worm and worm wheel being configured to permit an auxiliary force to be applied from the electric motor to a motor vehicle steering unit through said driving worm and worm wheel.

2. The apparatus of claim 1 wherein the two bearing noses support the roller bearing by an outer ring of the roller bearing.

3. The apparatus of claim 1 further comprising an elastomeric element disposed between the roller bearing and the outer sleeve.

4. The apparatus of claim 1 further comprising an elastomeric element vulcanized onto the roller bearing.

5. The apparatus of claim 1 further comprising an elastomeric element disposed within the outer sleeve.

6. The apparatus of claim 1 further comprising an elastomeric element vulcanized onto the roller bearing and disposed within the outer sleeve.

7. The apparatus of claim 1 wherein the outer sleeve has a width extending in a direction along the bearing axis that is larger than a width of an outer sleeve of the roller bearing extending in a direction along the bearing axis.

8. The apparatus of claim 1 further comprising:
   a housing; and
   a cover, wherein a housing section of the housing forms the outer sleeve and is configured to receive the roller bearing, wherein the housing section is closed off by the cover to hold the roller bearing.

9. The apparatus of claim 1 wherein the two bearing noses are disposed on a face end of the outer sleeve that faces the driving worm, wherein a second pair of bearing noses are disposed on a far face end of the outer sleeve that faces away from the driving worm.

10. The apparatus of claim 9 wherein the four bearing noses lie in a plane and support the roller bearing.

11. The apparatus of claim 1 wherein the pivoting axis is substantially parallel to a rotational axis of the worm wheel.

* * * * *